United States Patent
Kwon et al.

(10) Patent No.: US 9,391,344 B2
(45) Date of Patent: Jul. 12, 2016

(54) POLYMER ELECTROLYTE AND LITHIUM SECONDARY BATTERY INCLUDING THE SAME

(71) Applicant: LG Chem, Ltd., Seoul (KR)

(72) Inventors: YoHan Kwon, Daejeon (KR);
Sung-Kyun Chang, Daejeon (KR);
Seung-tae Hong, Daejeon (KR); Je Young Kim, Daejeon (KR); ByungHun Oh, Daejeon (KR)

(73) Assignee: LG Chem, Ltd. (KR)

(*) Notice: Subject to any disclaimer, the term of this patent is extended or adjusted under 35 U.S.C. 154(b) by 26 days.

(21) Appl. No.: 14/141,703

(22) Filed: Dec. 27, 2013

(65) Prior Publication Data

US 2014/0106236 A1   Apr. 17, 2014

Related U.S. Application Data

(63) Continuation of application No. PCT/KR2012/004827, filed on Jun. 19, 2012.

(30) Foreign Application Priority Data

Jun. 30, 2011   (KR) .................... 10-2011-0064268

(51) Int. Cl.
*H01M 10/0565* (2010.01)
*H01M 10/052* (2010.01)
*H01M 8/02* (2016.01)

(52) U.S. Cl.
CPC ........ *H01M 10/0565* (2013.01); *H01M 10/052* (2013.01); *H01M 8/0204* (2013.01);

(Continued)

(58) Field of Classification Search
CPC ..................... H01M 10/0564; H01M 10/0565; H01M 2300/0094; H01M 2300/0082; H01M 2300/0085; H01M 8/1053
USPC .................................................. 429/309, 144
See application file for complete search history.

(56) References Cited

U.S. PATENT DOCUMENTS

5,639,573 A   6/1997   Oliver et al.
6,124,251 A   9/2000   Rader et al.
(Continued)

FOREIGN PATENT DOCUMENTS

CN   1205688 C   6/2005
CN   100536221 C   9/2009
(Continued)

OTHER PUBLICATIONS

International Search Report for International Application No. PCT/KR2012/004827 mailed Dec. 20, 2012.

*Primary Examiner* — Stewart Fraser
*Assistant Examiner* — Rachel L Zhang
(74) *Attorney, Agent, or Firm* — Lerner, David, Littenberg, Krumholz & Mentlik, LLP

(57) ABSTRACT

Disclosed is a polymer electrolyte having a multilayer structure including a first polymer layer providing mechanical strength against external force and a second polymer layer to secure a conduction path for lithium ions, wherein the first polymer layer includes an organic electrolyte containing an ionic salt in an amount of 0 wt % to 60 wt % based on a weight of a polymer matrix of the first polymer layer and the second polymer layer includes an organic electrolyte containing an ionic salt in an amount of 60 wt % to 400 wt % based on a weight of a polymer matrix of the second polymer layer, and a lithium secondary battery including the same.

22 Claims, 2 Drawing Sheets

(52) U.S. Cl.
    CPC ........... *H01M 8/0206* (2013.01); *H01M 8/0213* (2013.01); *H01M 8/0228* (2013.01); *H01M 2300/0082* (2013.01); *H01M 2300/0085* (2013.01); *H01M 2300/0094* (2013.01); *Y02E 60/122* (2013.01); *Y02T 10/7011* (2013.01)

(56) References Cited

U.S. PATENT DOCUMENTS

| | | | |
|---|---|---|---|
| 7,238,444 B2 * | 7/2007 | Sada et al. | 429/144 |
| 7,399,556 B2 | 7/2008 | Lee et al. | |
| 2003/0232240 A1 * | 12/2003 | Lee | C08J 5/20 429/122 |
| 2004/0029010 A1 | 2/2004 | Sada et al. | |
| 2005/0271948 A1 | 12/2005 | Kang et al. | |
| 2007/0015060 A1 | 1/2007 | Klaassen | |
| 2008/0050644 A1 * | 2/2008 | Christensen | H01M 6/5005 429/50 |
| 2009/0104537 A1 | 4/2009 | Deschamps | |
| 2012/0237838 A1 * | 9/2012 | Uesaka | 429/405 |
| 2012/0288770 A1 * | 11/2012 | Yokoyama | 429/316 |
| 2013/0216916 A1 | 8/2013 | Deschamps, Sr. | |

FOREIGN PATENT DOCUMENTS

| | | |
|---|---|---|
| EP | 1598896 A1 | 11/2005 |
| JP | 2000-048639 A | 2/2000 |
| JP | 2001-023694 | 1/2001 |
| JP | 2003-217664 A | 7/2003 |
| JP | 2003-217666 A | 7/2003 |
| JP | 4140240 B2 | 8/2008 |
| KR | 10-2001-0055968 A | 7/2001 |
| KR | 10-2001-0066272 A | 7/2001 |
| KR | 10-2003-0005254 A | 1/2003 |
| KR | 20030005255 A | 1/2003 |
| KR | 10-2004-0092189 A | 11/2004 |
| WO | 2008/070059 A2 | 6/2008 |
| WO | 2011052440 A1 | 5/2011 |

* cited by examiner

POLYMER ELECTROLYTE AND LITHIUM SECONDARY BATTERY INCLUDING THE SAME

CROSS-REFERENCE TO RELATED APPLICATIONS

This application is a continuation of PCT/KR2012/004827, filed on Jun. 19, 2012, which claims the priority of Korean Patent Application No. 10-2011-0064268, filed on Jun. 30, 2011 in the Korean Intellectual Property Office, the disclosures of which are incorporated herein by reference.

TECHNICAL FIELD

The present invention relates to a novel polymer electrolyte and a lithium secondary battery including the same. More particularly, the present invention relates to a polymer electrolyte having a multilayer structure including a first polymer layer providing mechanical strength against external force and a second polymer layer to secure a conduction path for lithium ions, wherein the first polymer layer includes an organic electrolyte containing an ionic salt in an amount of 0 wt % to 60 wt % based on a weight of a polymer matrix of the first polymer layer and the second polymer layer includes an organic electrolyte containing an ionic salt in an amount of 60 wt % to 400 wt % based on a weight of a polymer matrix of the second polymer layer, and a lithium secondary battery including the same.

BACKGROUND ART

As energy source prices are increasing due to depletion of fossil fuels and interest in environmental pollution is escalating, demand for environmentally-friendly alternative energy sources is bound to play an increasing role in future life. Thus, research into various power generation techniques such as nuclear energy, solar energy, wind energy, tidal power, and the like, continues to be underway, and power storage devices for more efficient use of the generated energy are also drawing much attention. As these power storage devices, secondary batteries are mainly used. Among these, in particular, lithium secondary batteries are mainly used in portable devices, demand therefor increases due to lightweight, high voltage, and high capacity, and use of lithium secondary batteries continues to expand to applications such as electric vehicles, hybrid electric vehicles, and auxiliary power supplies through smart-grid technology.

However, to use lithium secondary batteries as high-capacity power sources, many challenges that need to be addressed remain, and the most important challenge is improvement in energy density and safety. In addition, uniformity of wetting due to large-scale area and reduction in manufacturing time are also one of the most important challenges to be addressed. Therefore, many researchers have put spurs to research into materials that have enhanced energy density and are manufactured at low cost and also put much effort into research on materials for enhancing safety.

As materials for enhancing energy density, Ni-based materials, Mn-based materials, and the like having higher capacity than that of conventionally used $LiCoO_2$ have been studied, and research into materials for forming an anode through Li alloy reaction instead of conventional intercalation reaction using Si, Sn, or the like, not using existing graphite-based materials is underway.

To enhance safety, research into a stable olivine-based cathode active material such as $LiFePO_4$, an anode active material such as $Li_4Ti_5O_{12}$, or the like is underway. However, such materials for enhancing safety fundamentally have low energy density and do not fundamentally address problems in terms of safety, caused due to structures of lithium secondary batteries.

Safety of secondary batteries may largely be classified into internal safety and external safety and further classified into electrical safety, impact safety, thermal safety, and the like. In these various safety problems, temperature increases when problems occur and, in this case, contraction of generally used stretching separators inevitably occurs.

Therefore, many researchers have proposed all solid type batteries to address safety problems, but such batteries cannot replace commercially available batteries due to several problems thereof.

First, currently used electrode active materials are in a solid state and, when a solid electrolyte or a polymer electrolyte is used, a contact surface between the solid electrolyte or the polymer electrolyte and the electrode active material for migration of lithium is very small. As a result, although a solid electrolyte or a polymer electrolyte itself has a conductivity of $10^{-5}$ S/cm, which corresponds to conductivity of a liquid electrolyte, ionic conductivity thereof is very low.

Second, for such reason, ionic conductivity occurring at an interface between solids or an interface between a solid and a polymer is inevitably further reduced.

Third, adhesive strength is important in manufacture of a battery and, even if a solid electrolyte with high conductivity is used, it is necessary to use a polymer binder, which causes further reduction in ionic conductivity.

Fourth, to manufacture a battery, only a separation layer does not require ionic conductivity. To enhance ionic conductivity of an electrode, cathode and anode active materials also require materials for enhancing ionic conductivity and, when a solid electrolyte or a polymer electrolyte is used as an electrode component, capacity is reduced.

Fifth, when a polymer electrolyte including an organic electrolyte is used, mechanical/physical properties and ionic conductivity have trade-off relationship and thus, when the amount of the organic electrolyte is increased to enhance ionic conductivity, mechanical/physical properties of a polymer electrolyte layer are significantly deteriorated.

Therefore, there is a high need to develop a battery that prevents short circuit due to contraction of a separator and has excellent electrical performance.

DISCLOSURE

Technical Problem

The present invention aims to address the aforementioned problems of the related art and to achieve technical goals that have long been sought.

Thus, inventors of the present application have intensively studied and implemented various experiments and, consequently, found that mechanical/physical properties and ionic conductivity of a polymer layer, which have trade-off relationship, may be appropriately adjusted by varying a weight of an organic electrolyte containing an ionic salt based on a weight of a polymer matrix of the polymer layer, thus completing the present invention.

Thus, an object of the present invention is to provide a polymer electrolyte with flexibility and mechanical strength and having high ionic conductivity and a multilayer structure and a lithium secondary battery including the same.

Technical Solution

In accordance with one aspect of the present invention, provided is a polymer electrolyte having a multilayer structure including a first polymer layer providing mechanical strength against external force and a second polymer layer to secure a conduction path for lithium ions, wherein the first polymer layer includes an organic electrolyte containing an ionic salt in an amount of 0 wt % to 60 wt % based on a weight of a polymer matrix of the first polymer layer and the second polymer layer includes an organic electrolyte containing an ionic salt in an amount of 60 wt % to 400 wt % based on a weight of a polymer matrix of the second polymer layer.

The polymer electrolyte according to the present invention has a multilayer structure including a first polymer layer with excellent flexibility and mechanical strength and a second polymer layer to secure a conduction path for lithium ions in a battery according to diffusion of an organic electrolyte included therein into an electrode and thus prevents internal short circuit due to externally applied force and also exhibits high ionic conductivity.

That is, the first polymer layer has excellent flexibility and mechanical strength and thus prevents internal short circuit due to externally applied force, and the second polymer layer has high ionic conductivity by securing a conduction path for lithium ions in a battery according to diffusion of an organic electrolyte included therein into an electrode.

The functions of the first and second polymer layers mean main functions thereof and thus the first polymer layer also provides a predetermined conduction path for lithium ions and the second polymer layer also provides predetermined mechanical strength.

However, as described above, mechanical/physical properties and ionic conductivity of the polymer electrolyte have trade-off relationship and thus there is limitation in simultaneously satisfying the two properties in a singly polymer layer.

Thus, the first polymer layer of the polymer electrolyte includes 0 wt % to 60 wt % of an ionic salt-containing organic electrolyte based on a weight of a polymer matrix of the first polymer layer, and the second polymer layer of the polymer electrolyte includes 60 wt % to 400 wt % of an ionic salt-containing organic electrolyte based on a weight of a polymer matrix of the second polymer layer.

When the amount of the organic electrolyte in the second polymer layer is less than 60 wt %, ionic conductivity may be increased while the second polymer layer becomes a fluid due to loss of self-supporting ability of a gel and thus coefficient of elasticity is reduced, which results in deteriorated mechanical/physical properties. On the other hand, when the amount of the organic electrolyte in the second polymer layer exceeds 400 wt %, the organic electrolyte may be leaked out.

Thus, the first polymer layer includes an organic electrolyte containing an ionic salt in an amount of 0 wt % to 60 wt %, preferably 0.1 wt % to 60 wt %, based on the weight of a polymer matrix of the first polymer layer.

In the present specification, the first polymer layer collectively represents polymer layers providing mechanical strength against external force and the second polymer layer collectively represents polymer layers to secure a conduction path for lithium ions, and thus, the polymer electrolyte has a multilayer structure including the first and second polymer layers and embodiments of the present invention are not limited to the two layer structure consisting of the first and second polymer layers.

Thus, in an exemplary embodiment of the present invention, the polymer electrolyte may have a structure in which the first polymer layer is formed on an upper surface and/or a lower surface of the second polymer layer contacting any one of a cathode and an anode or a structure in which the second polymer layer is formed on an upper surface and/or a lower surface of the first polymer layer contacting any one of a cathode and an anode.

Meanwhile, composition of the organic electrolyte is not particularly limited so long as the organic electrolyte is partially introduced into an electrode and thus increases ionic conductivity. Preferably, an organic electrolyte containing an ionic salt may be used.

The ionic salt may for example be a lithium salt, and the lithium salt may be at least one selected from the group consisting of $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_nNLi$, chloroborane lithium, lower aliphatic carboxylic acid lithium, and lithium tetraphenyl borate, without being limited thereto.

The organic electrolyte may be at least one material selected from the group consisting of ethylene carbonate, propylene carbonate, butylene carbonate, vinylene carbonate, diethyl carbonate, dimethyl carbonate, ethyl methyl carbonate, gamma butyrolactone, sulfolane, methyl acetate, and methyl propionate, without being limited thereto.

In a specific embodiment, each of the first and second polymer layers may include two phases including: an organic electrolyte that contains an ionic salt and is partially introduced into an electrode from a separation layer in a process of manufacturing an electrode assembly to increase ionic conductivity of the electrode; and at least one polymer matrix selected from among a linear polymer having affinity with the organic electrolyte and providing adhesive strength for a cathode and an anode and a crosslinked polymer having a three-dimensional network structure.

A viscoelastic structure having the above-described composition may have a structure in which independent gels consisting of the crosslinked polymer are physically interconnected by the linear polymers in a state of being impregnated with a liquid-phase component.

That is, each of the independent gels consisting of the crosslinked polymer forms a cross-linking point and the cross-linking points are physically interconnected by the linear polymers, whereby a network may be formed and, accordingly, the liquid phase component may be impregnated in a large amount.

The linear polymers may have, for example, a physical connection structure such that a portion of the linear polymers permeates the gels formed of the crosslinked polymers. Such a structure is preferably used for formation of the above-described network, and the size of the portion of the linear polymers, permeating the gels formed of the crosslinked polymers, may be less than 50%, more preferably between 5 and 45%, based on a total size of the linear polymers.

In general, when a membrane consisting of a single crosslinked structure and having a high degree of cross-linking is used, mobility of polymer chains, which affect movement of ions, is suppressed and thus ionic conductivity tends to decrease and the membrane exhibits brittleness in terms of mechanical/physical properties.

By contrast, when the above-described viscoelastic structure is used, polymer chains have appropriate mobility due to the linear polymer and thus may have high ionic conductivity, and the crosslinked polymer forms cross-linking points in the polymer matrix and the linear polymer interconnects the cross-linking points and thus the polymer electrolyte may have elasticity and, accordingly, may have excellent mechanical/physical properties.

In particular, the polymer layers according to the present invention have the above-described viscoelastic structure and thus may have an ionic conductivity of $10^{-5}$ S/cm to $10^{-3}$ S/cm, a tensile strength of 1 MPa to 100 MPa, and an elongation percentage of 20% to 500%. When compared to a general polymer layer having a tensile strength of 0.1 MPa or less when an ionic conductivity thereof is $10^{-3}$ S/cm, the polymer layers according to the present invention satisfies both flexibility and mechanical strength and has enhanced ionic conductivity.

In the polymer matrix of each of the first and second polymer layers, a ratio of linear polymer to crosslinked polymer is not particularly limited so long as the ratio enables formation of the viscoelastic structure and may be between 1:9 and 8:2.

When the amount of the linear polymer is too small or too great, mechanical/physical properties may be deteriorated due to low elasticity and impregnation performance of the liquid phase component may be deteriorated. For this reason, the ratio of linear polymer to crosslinked polymer may be 3:7 to 7:3.

The linear polymers constituting the polymer matrices are not particularly limited. In an exemplary embodiment, however, the linear polymer may be at least one selected from the group consisting of a polyoxide-based non-crosslinked polymer and a polar non-crosslinked polymer.

More particularly, the polymer matrix may include both a polyoxide-based non-crosslinked polymer and a polar non-crosslinked polymer.

The polyoxide-based non-crosslinked polymer may for example be at least one selected from the group consisting of poly(ethylene oxide), poly(propylene oxide), poly(oxymethylene), and poly(dimethylsiloxane), without being limited thereto.

The polar non-crosslinked polymer may for example be at least one selected from the group consisting of polyacrylonitrile, poly(methyl methacrylate), poly(vinyl chloride), poly(vinylidene fluoride), poly(vinylidenefluoride-co-hexafluoropropylene), poly(ethylene imine), and poly(p-phenylene terephthalamide), without being limited thereto.

The cross-linked polymer constituting the polymer matrix may be a polymer of monomers having at least two functional groups, or a copolymer of monomers having at least two functional groups and polar monomers having a single functional group.

The monomers having at least two functional groups are not particularly limited and, for example, may be at least one selected from the group consisting of trimethylolpropane ethoxylate triacrylate, polyethylene glycol dimethacrylate, polyethylene glycol diacrylate, divinylbenzene, polyester dimethacrylate, divinylether, trimethylolpropane, trimethylolpropane trimethacrylate, and ethoxylated bis phenol A dimethacrylate.

The polar monomers having a single functional group are not particularly limited and, for example, may be at least one selected from the group consisting of methyl methacylate, ethyl methacylate, butyl methacylate, methyl acrylate, butyl acrylate, ethylene glycol methyl ether acrylate, ethylene glycol methyl ether methacrylate, acrylonitrile, vinyl acetate, vinyl chloride, and vinyl fluoride.

In addition, each of the first and second polymer layers may further include a solid phase component providing mechanical strength. In this regard, the solid phase component may be included in an amount of 5 wt % to 80 wt % based on a weight of the polymer matrix of each of the first and second polymer layers.

When the amount of the solid phase component is less than 5 wt % based on the weight of the polymer matrix, effects of supporting the polymer layers, e.g., mechanical strength of the polymer layers may be insufficient. On the other hand, when the amount of the solid phase component exceeds 80 wt %, ionic conductivity is reduced and thus battery performance may be deteriorated and brittleness may occur during charge and discharge due to rigid characteristics. For this reason, the amount of the solid phase component may be 20 wt % to 50 wt % based on the weight of the polymer matrix.

The amount of the solid phase component may be adjusted according to desired mechanical strength.

The solid phase component is a solid compound having no reactivity with lithium ions and may be solid phase particles having an average particle diameter of 10 nm to 5 μm. When the average particle diameter of the solid phase component is too small, the solid phase component may exist in an agglomerated form and supporting of the separation layer may be insufficient. On the other hand, when the average particle diameter of the solid phase component is too large, the separation layer may be unnecessarily thick. For this reason, the solid phase component may have an average particle diameter of 50 nm to 200 nm.

In an exemplary embodiment, the solid compound may be at least one material selected from the group consisting of an oxide, a nitride, and a carbide that have no reactivity with lithium ions, but embodiments of the present invention are not limited thereto.

The oxide having no reactivity with lithium ions is not particularly limited. In an exemplary embodiment, however, the oxide having no reactivity with lithium ions may be at least one material selected from the group consisting of MgO, $TiO_2$(Rutile), and $Al_2O_3$.

In addition, in another exemplary embodiment of the present invention, the thickness of the first polymer layer may be 10% to 100% based on the thickness of the second polymer layer. It is obvious that the first polymer layer has mechanical strength and thus, as the thickness of the first polymer layer increases, higher mechanical strength is obtained, but an overall size of a lithium secondary battery increases according to increase in the thickness of the first polymer layer and internal resistance is increased in accordance with the increased thickness of the first polymer layer.

In this case, the first polymer layer may include a larger amount of the solid phase component than that included in the second polymer layer, whereby mechanical strength may be maintained and the first polymer layer may have a small thickness. In this regard, the thickness of the first polymer layer may be 50% to 100% based on the thickness of the second polymer layer.

When the thickness of the first polymer layer is less than 50% based on the thickness of the second polymer layer, it may be difficult to achieve desired ionic conductivity and desired mechanical strength against external force. On the other hand, when the thickness of the first polymer layer exceeds 100%, the first polymer layer is thicker than the second polymer layer and thus internal resistance is increased.

In addition, the present invention also provides an electrode assembly including a cathode, an anode, and the polymer electrolyte disposed between the cathode and the anode.

In the electrode assembly according to the present invention, the cathode manufactured by, for example, coating, on a cathode current collector, a slurry prepared by adding a cathode mixture including a cathode active material to a solvent such as NMP or the like and drying the coated cathode current collector. The cathode mixture may optionally further include a binder, a conductive agent, a filler, a viscosity controlling agent, and an adhesion promoter.

The cathode current collector is generally fabricated to a thickness of 3 to 500 μm. The cathode current collector is not particularly limited so long as it does not cause chemical changes in the fabricated battery and has high conductivity. For example, the cathode current collector may be made of stainless steel, aluminum, nickel, titanium, sintered carbon, aluminum or stainless steel surface-treated with carbon, nickel, titanium, or silver, or the like. In addition, the cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

The cathode active material is a material causing electrochemical reaction and may be a lithium transition metal oxide including at least two transition metals. Examples of the lithium transition metal oxide include, without being limited to, layered compounds such as lithium cobalt oxide ($LiCoO_2$) and lithium nickel oxide ($LiNiO_2$) substituted with one or more transition metals; lithium manganese oxides substituted with at least one transition metal; lithium nickel-based oxides having the formula $Li Ni_{1-y}M_yO_2$, where M is at least one element selected from among Co, Mn, Al, Cu, Fe, Mg, B, Cr, Zn, and Ga and $0.01 \leq y \leq 0.7$; lithium nickel cobalt manganese composite oxides represented by $Li_{1+z}Ni_bMn_cCo_{1-(b+c+d)}M_dO_{(2-e)}A_e$, where $-0.5 \leq z \leq 0.5$, $0.1 \leq b \leq 0.8$, $0.1 \leq c \leq 0.8$, $0 \leq d \leq 0.2$, $0 \leq e \leq 0.2$, $b+c+d<1$, M is Al, Mg, Cr, Ti, Si, or Y, and A=F, P, or Cl, such as $Li_{1+z}Ni_{1/3}Co_{1/3}Mn_{1/3}O_2$, $Li_{1+z}Ni_{0.4}Mn_{0.4}Co_{0.2}O_2$, and the like; and olivine-based lithium metal phosphate represented by $Li_{1+x}M_{1-y}M'_yPO_{4-z}X_z$ where M=transition metal, preferably, Fe, Mn, Co, or Ni, M'=Al, Mg, or Ti, X=F, S, or N, $-0.5 \leq x \leq +0.5$, $0 \leq y \leq 0.5$, and $0 \leq z \leq 0.1$.

Examples of the binder include, without being limited to, polytetrafluoroethylene (PTFE), poly vinylidene, fluoride (PVdF), cellulose, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, various copolymers, and polyvinyl alcohol with high degree of hydrolysis.

The conductive material is not particularly limited so long as it does not cause chemical changes in the fabricated battery and has conductivity. Examples of the conductive material include, without being limited to, graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives. In particular, commercially available conductive materials include acetylene black series manufactured by Chevron Chemical, Denka black manufactured by Denka Singapore private limited, products manufactured by Gulf Oil, Ketjen black, EC series manufactured by Armak, Vulcan XC-72 manufactured by Cabot, and Super P manufactured by Timcal.

The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

The viscosity controlling agent is a component for controlling the viscosity of an electrode mixture so as to facilitate mixing of the electrode mixture and coating thereof on a current collector and may be added in an amount of 30 wt % based on a total weight of an anode mixture. Examples of the viscosity controlling agent include, without being limited to, carboxymethylcellulose and polyvinylidene fluoride. In some cases, the above-described solvent may serve as a viscosity controlling agent.

The adhesion promoter is an auxiliary component added to enhance adhesion between an electrode active material and an electrode current collector and may be added in an amount of 10 wt % or less based on the amount of the binder. Examples of the adhesion promoter include, without being limited to, oxalic acid, adipic acid, formic acid, acrylic acid derivatives, and itaconic acid derivatives.

The anode is manufactured by, for example, coating, on an anode current collector, a slurry prepared by adding an anode mixture including an anode active material to a solvent such as NMP or the like and drying the coated anode current collector. The anode mixture may optionally further include the components described above with regards to the configuration of the cathode, such as the binder, the conductive agent, the filler, the viscosity controlling agent, and the adhesion promoter.

The anode current collector is typically fabricated to a thickness of 3 to 500 μm. The anode current collector is not particularly limited so long as it does not cause chemical changes in the fabricated secondary battery and has conductivity. For example, the anode current collector may be made of copper, stainless steel, aluminum, nickel, titanium, sintered carbon, copper or stainless steel surface-treated with carbon, nickel, titanium, or silver, and aluminum-cadmium alloys. The anode current collector may also have fine irregularities at a surface thereof to enhance adhesion between the anode current collector and an anode active material and be used in various forms including films, sheets, foils, nets, porous structures, foams, and non-woven fabrics.

Examples of the anode active material include, without being limited to, carbon and graphite materials such as natural graphite, artificial graphite, expandable graphite, carbon fibers, hard carbon, carbon black, carbon nanotubes, fullerene, and activated carbon; metals alloyable with lithium such as Al, Si, Sn, Ag, Bi, Mg, Zn, In, Ge, Pb, Pt, and Ti and compounds containing these elements; complexes of metals and compounds thereof and complexes of carbon and graphite materials; and lithium-containing nitrides. Among these, a carbon-based active material, a tin-based active material, a silicon-based active material, or a silicon-carbon-based active material is more preferably used. These anode active materials may be used alone or in combination of two or more thereof.

According to experimental results obtained by the inventors of the present invention, a secondary battery undergoes highest risks in a charged state with high energy, and short circuit, which may occur due to contraction of a separator in the charged state, or the like in a charged state, occurs in four cases: contact between a charged cathode and a charged anode; contact between a charged cathode and an anode current collector; contact between an anode current collector and a cathode current collector; and contact between a cathode current collector and a charged anode.

From the experimental results obtained by implementing an experiment using a charged electrode in a dry room under the above-described conditions, it can be confirmed that the severest thermal runaway occurred at the contact between a charged anode and a cathode current collector, contrary to what one would expect. The intensive studies found that such occurrence is caused by rapid exothermic reaction represented by $4Al + 3O_2 \rightarrow 2Al_2O_3$ at, for example, an Al-foil as a cathode current collector. In most cases in which batteries exploded, the Al-foil cannot be found.

From the experiment, occurrence of thermal runaway only at the contact between a charged anode and a cathode current collector was confirmed, but it cannot be concluded that the other three cases are safe. In batteries, any contact between a cathode and an anode is dangerous.

By contrast, in the electrode assembly according to the present invention, the polymer matrices and the solid phase component do not contract at high temperatures and thus occurrence of events, such as explosion, as in the experiment, and the like may be prevented, which results in excellent high-temperature safety.

In addition, the liquid phase component is partially introduced into an electrode in a process of manufacturing the electrode assembly, e.g., a lamination process and thus impregnate the electrode, whereby ionic conductivity of the electrode is enhanced, which results in enhanced battery performance.

In addition, the electrolyte is uniformly wetted in the electrode and thus may minimize electrode degradation according to non-uniform permeation of the electrolyte, which is the biggest problem in large area fabrication. Thus, in the electrode assembly according to the present invention, the organic electrolyte derived from the polymer electrolyte may be included or embedded in the electrode, related to state of the organic electrolyte. In this regard, the amount of the organic electrolyte derived from the polymer electrolyte, included or embedded in the electrode, is not particularly limited and may for example be 10 to 90% based on a total amount of the organic electrolyte entirely included in the electrode assembly.

In addition, according to the present invention, since the polymer electrolyte includes the organic electrolyte and the polymer matrices in which a linear polymer and a crosslinked polymer form a viscoelastic structure, if necessary, in a state of including the solid phase component, although volumetric expansion and contraction of the electrode are continuously repeated during charge and discharge of a battery, changes in volume may be reduced due to the viscoelastic structure and thus the battery may have high durability and, accordingly, may have enhanced cycle characteristics.

The present invention also provides a method of manufacturing the electrode assembly, the method including:

uniformly mixing a linear polymer, a monomer for crosslinked polymers, an organic electrolyte containing an ionic salt, and, optionally, a solid phase component and a polymerization initiator;

coating a mixture for forming a first polymer layer on an electrode and coating a mixture for forming a second polymer layer on the first polymer layer;

forming a separation layer by performing polymerization through UV irradiation or application of heat; and mounting a counter electrode on the separation layer and pressing the resulting structure.

The present invention also provides a lithium secondary battery including the electrode assembly. The lithium secondary battery may include the electrode assembly and, optionally, a lithium salt-containing non-aqueous electrolyte. In one exemplary embodiment, the lithium secondary battery may not include a separate lithium salt-containing non-aqueous electrolyte or may include only a small amount thereof.

The present invention also provides a medium or large-scale battery module including the lithium secondary battery as a unit battery and a battery pack including the battery module.

The battery pack may be used, in particular, in medium or large-scale devices which require high rate characteristics and high-temperature safety. For example, the battery pack may be used as a power source of electric motor-driven power tools; electric vehicles (EVs), hybrid electric vehicles (HEVs), and plug-in hybrid electric vehicles (PHEVs); electric two-wheeled vehicles such as E-bikes and E-scooters; and electric golf carts and may be used in systems for storing power, but embodiments are not limited thereto.

BRIEF DESCRIPTION OF THE DRAWINGS

The above and other objects, features and other advantages of the present invention will be more clearly understood from the following detailed description taken in conjunction with the accompanying drawings, in which.

MODE FOR INVENTION

Now, the present invention will be described in more detail with reference to the accompanying drawings. These examples are provided only for illustrative purposes and should not be construed as limiting the scope and spirit of the present invention.

Example 1

Preparation of Mixture for Forming First Polymer Layer

5% PVdF-HFP and an organic electrolyte (1M $LiPF_6$, EC/PC=1/1) were mixed in a weight ratio of 70:30, and acetone as a solvent dissolving a polymer was used, thereby preparing a mixture for forming a first polymer layer providing mechanical strength.

Preparation of Mixture for Forming Second Polymer Layer

5% PVdF-HFP and an organic electrolyte (1M $LiPF_6$, EC/PC=1/1) were mixed in a weight ratio of 22:78, and acetone as a solvent dissolving a polymer was used, thereby preparing a mixture for forming a second polymer layer providing ionic conductivity.

Preparation of Polymer Electrolyte Membrane

The prepared mixture for forming a first polymer layer was cast on a glass plate and acetone was evaporated to prepare an electrolyte membrane (a first polymer layer), and the prepared mixture for forming a second polymer layer was cast on the first polymer layer and acetone was evaporated, thereby completing preparation of a polymer electrolyte membrane including the first and second polymer layers.

Figure 1:
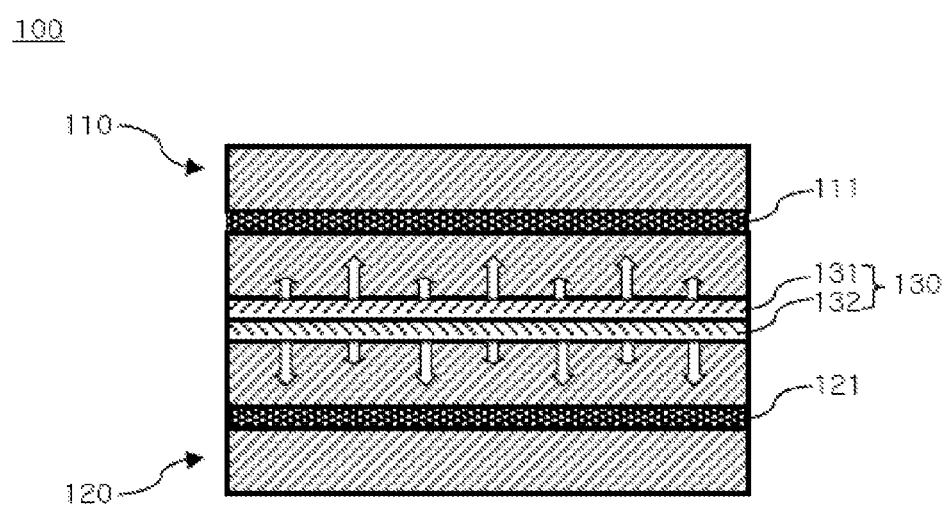
FIG. 1 is a vertical sectional view of an electrode assembly including a polymer electrolyte having a multilayer structure according to the present invention.

FIG. 1 is a vertical sectional view of an electrode assembly 100 including a polymer electrolyte 130 having a multilayer structure according to the present invention.

The polymer electrolyte 130 having a multilayer structure includes two layers including a first polymer layer 131 providing mechanical strength against external force and a second polymer layer 132 to secure a conduction path for lithium ions. As represented by arrows in FIG. 1, it can be confirmed that an organic electrolyte included in each of the first and second polymer layers 131 and 132 is diffused into a cathode and an anode.

Comparative Example 1

The mixture for forming a first polymer layer of Example 1 was cast on a glass plate and acetone was evaporated to prepare an electrolyte membrane.

Comparative Example 2

The mixture for forming a second polymer layer of Example 1 was cast on a glass plate and acetone was evaporated to prepare an electrolyte membrane.

Experimental Example 1

Measurement of Mechanical Properties and Ionic Conductivity

Tensile strength and ionic conductivity of the electrolyte membranes of Example 1 and Comparative Examples 1 and 2 were measured, and measurement results are shown in Table 1 below.

TABLE 1

|  | Ionic conductivity (mS/cm) | Tensile strength (Mpa) |
| --- | --- | --- |
| Example 1 | 1.4 | 2.2 |
| Comparative Example 1 | 0.0021 | 6.5 |
| Comparative Example 2 | 4.2 | 0.02 |

As shown in Table 1 above, the electrolyte membrane of Comparative Example 1 exhibits excellent mechanical/physical properties while having poor ionic conductivity, and the electrolyte membrane of Comparative Example 2 exhibits weak mechanical strength while having high ionic conductivity. By contrast, it can be confirmed that the polymer electrolyte membrane of Example 1 exhibits higher ionic conductivity and mechanical strength than those of the electrolyte membranes of Comparative Examples 1 and 2.

Meanwhile, referring to FIG. 1, the electrode assembly 100 includes a cathode 110, an anode 120, and the polymer electrolyte 130 having a multilayer structure. In particular, the polymer electrolyte 130 having a multilayer structure is disposed between the cathode 110 and the anode 120.

Hereinafter, effects of the polymer electrolyte 130 having a multilayer structure on battery performance were evaluated using a half cell manufactured using Li metal as the anode 120.

Example 2

$LiCoO_2$, PVdF, and carbon black were added to N-methylpyrrolidone to prepare a slurry, the slurry was coated on a Cu foil, and the coated Cu foil was dried at about 130° C. for 2 hours, thereby completing fabrication of a cathode. The first polymer layer of Example 1 was coated on the cathode and the second polymer layer was coated thereon, thereby completing formation of a polymer electrolyte membrane having a multilayer structure. The cathode coated with the prepared polymer electrolyte and Li metal as a counter electrode were used to manufacture a half cell.

Comparative Example 3

The cathode and separator of Example 2, Li metal as a counter electrode, and an organic electrolyte (1M $LiPF_6$, EC/PC=1/1) were used to manufacture a half cell.

Experimental Example 2

Battery Performance Test

Charge and discharge characteristics of the half cells manufactured according to Example 2 and Comparative Example 3 were evaluated. Charging was performed at a constant current and a current density of 0.1 C until voltage reached 4.25 V and at a constant voltage of 4.25 V until current density reached 0.05 C. Discharging was performed at a constant current and a current density of 0.1 C until voltage reached 3.0 V. Under the same conditions, 15 cycles of charging and discharging were repeated. Evaluation results are shown in FIGS. 2 and 3.

Figure 2:
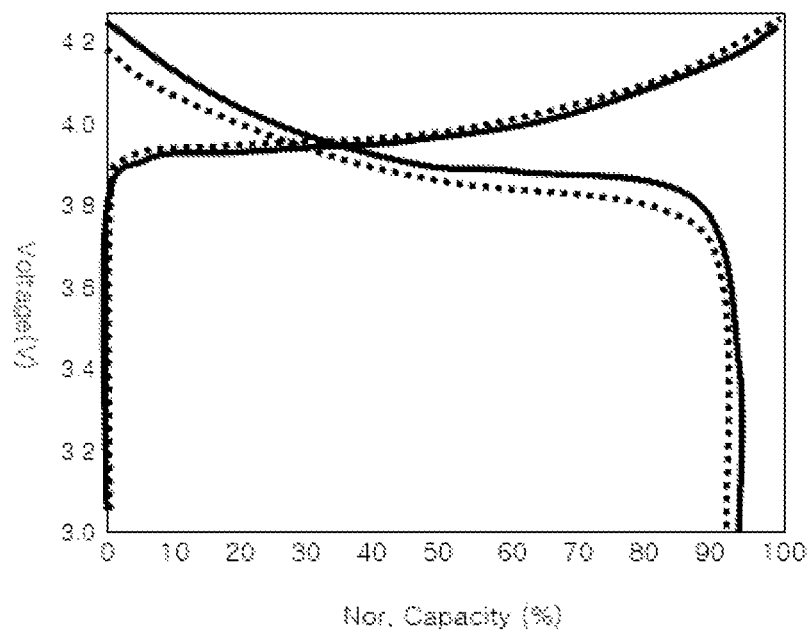
FIG. 2 is a graph showing charge and discharge characteristics of batteries of Example 2 and Comparative Example 3.

In FIG. 2, a plot corresponding to Example 2 is represented by a dotted line, and a plot corresponding to Comparative Example 3 is represented by a solid line.

Figure 3:
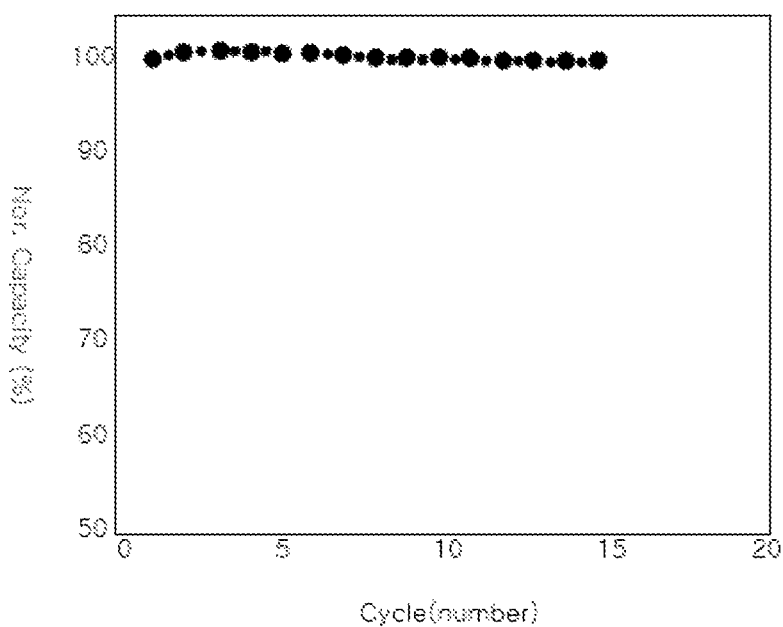
FIG. 3 is a graph showing measurement results of cycle lifespan characteristics of the battery of Example 2.

Referring to FIGS. 2 and 3, it can be confirmed that the half cell of Example 2 has higher battery resistance than that of the half cell of Comparative Example 3 using a liquid electrolyte while exhibiting excellent capacity and charge and discharge characteristics, as in the half cell of Comparative Example 3 using a liquid electrolyte. In addition, it can be confirmed that the half cell of Example 2 undergoes no reduction in capacity during 15 cycles of charging and discharging. That is, the battery of Example 2 exhibits excellent cycle characteristics.

INDUSTRIAL APPLICABILITY

As described above, a polymer electrolyte according to the present invention has a multilayer structure including a first polymer layer providing high flexibility and mechanical strength and a second polymer layer to secure a conduction path for lithium ions in a battery according to diffusion of an organic electrolyte included therein into an electrode and thus may prevent internal short circuit due to force applied from the outside and exhibit excellent ionic conductivity.

In addition, according to a lithium secondary battery according to the present invention, an electrolyte is uniformly wetted in an electrode and thus may minimize electrode degradation according to non-uniform permeation of the electrolyte, which is the biggest problem in large area fabrication.

In addition, in the lithium secondary battery according to the present invention, since the polymer electrolyte includes an organic electrolyte and polymer matrices in which a linear polymer and a crosslinked polymer form a viscoelastic structure, if necessary, in a state of including a solid phase component, although volumetric expansion and contraction of the electrode are continuously repeated during charge and discharge, changes in volume may be reduced due to the viscoelastic structure and thus the lithium secondary battery may have high durability and, accordingly, may have enhanced cycle characteristics.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A polymer electrolyte having a multilayer structure comprising:
    a first polymer layer to provide mechanical strength against external force; and
    a second polymer layer to secure a conduction path for lithium ions,
    wherein the first polymer layer comprises a first polymer matrix and an ionic salt-containing organic electrolyte in an amount ranging from 0 wt % to 60 wt %, based on a weight of the first polymer matrix, and
    wherein the second polymer layer comprises a second polymer matrix and an ionic salt-containing organic electrolyte in an amount ranging from 60 wt % to 400 wt %, based on a weight of the second polymer matrix, wherein the first and second polymer matrix are selected from the group consisting of a linear polymer having affinity with the organic electrolyte, a crosslinked polymer having a three-dimensional network structure, and combinations thereof, and wherein the linear polymer is a polar non-crosslinked polymer.

2. The polymer electrolyte according to claim 1, wherein the first polymer layer is disposed on an upper surface and/or a lower surface of the second polymer layer.

3. The polymer electrolyte according to claim 1, wherein the second polymer layer is disposed on an upper surface and/or a lower surface of the first polymer layer.

4. The polymer electrolyte according to claim 1, wherein the ionic salt is a lithium salt.

5. The polymer electrolyte according to claim 1, wherein each of the first and second polymer layers has a tensile strength of 1 MPa to 100 MPa.

6. The polymer electrolyte according to claim 1, wherein each of the first and second polymer layers has an elongation percentage of 20% to 500%.

7. The polymer electrolyte according to claim 1, wherein an amount of the ionic salt-containing organic electrolyte in the first polymer layer ranges from 0.1 wt % to 60 wt %, based on the weight of the first polymer matrix.

8. The polymer electrolyte according to claim 1, wherein each of the first and second polymer layers has an ionic conductivity ranging from $10^{-5}$ S/cm to $10^{-3}$ S/cm.

9. The polymer electrolyte according to claim 1, wherein a weight ratio of the linear polymer to the crosslinked polymer is 1:9 to 8:2.

10. The polymer electrolyte according to claim 1, wherein the first and second polymer matrix comprises both a polyoxide-based non-crosslinked polymer and a polar non-crosslinked polymer.

11. The polymer electrolyte according to claim 1, wherein the cross-linked polymer is a polymer of monomers having at least two functional groups, or a copolymer of monomers having at least two functional groups and polar monomers having a single functional group.

12. The polymer electrolyte according to claim 1, wherein each of the first and second polymer layers further comprises a solid phase component providing mechanical strength.

13. The polymer electrolyte according to claim 12, wherein an amount of the solid phase component in the first polymer layer ranges from 5 wt % to 80 wt %, based on the weight of the first polymer matrix, and wherein an amount of the solid phase component in the second polymer layer ranges from 5 wt % to 80 wt %, based on the weight of the second polymer matrix.

14. The polymer electrolyte according to claim 12, wherein the solid phase component is a solid compound having no reactivity with lithium ions, the solid compound comprising solid phase particles having an average particle diameter of 10 nm to 5 μm.

15. The polymer electrolyte according to claim 14, wherein the solid compound is at least one selected from the group consisting of an oxide, a nitride, and a carbide that have no reactivity with lithium ions.

16. The polymer electrolyte according to claim 1, wherein a thickness of the first polymer layer arranges from 10% to 100% based on a thickness of the second polymer layer.

17. An electrode assembly including a cathode, an anode, and the polymer electrolyte according to claim 1 disposed between the cathode and the anode.

18. A lithium secondary battery comprising the electrode assembly according to claim 17.

19. A battery module comprising the lithium secondary battery according to claim 18 as a unit battery.

20. A battery pack comprising the battery module according to claim 19.

21. A medium or large-scale device comprising the battery pack according to claim 20 as a power source.

22. The medium or large-scale device according to claim 21, wherein the medium or large-scale device is an electric vehicle, a hybrid electric vehicle, a plug-in hybrid electric vehicle, or a system for storing power.

* * * * *